United States Patent [19]

Vistitsky

[11] 4,090,732
[45] May 23, 1978

[54] VEHICLE SUN VISOR

[76] Inventor: Anatoli Vistitsky, 1527 W. Chase, Chicago, Ill. 60626

[21] Appl. No.: 785,421

[22] Filed: Apr. 7, 1977

[51] Int. Cl.² .............................................. B60J 3/02
[52] U.S. Cl. ................................ 296/97 C; 296/97 G
[58] Field of Search ............... 296/97 R, 97 A, 97 B, 296/97 C, 97 F, 97 G, 97 H, 95 C; 160/DIG. 3

[56] References Cited
U.S. PATENT DOCUMENTS

| 3,208,792 | 9/1965 | Martin | 296/97 C |
| 3,246,925 | 4/1966 | Calabrese | 296/97 R |
| 3,617,088 | 11/1971 | Graham | 296/97 C |
| 3,853,370 | 12/1974 | Barnhart | 296/97 G X |

FOREIGN PATENT DOCUMENTS

| 72,014 | 12/1956 | France | 296/97 G |
| 1,452,833 | 4/1965 | France | 296/97 C |

Primary Examiner—Joseph F. Peters, Jr.
Assistant Examiner—Gene A. Church

[57] ABSTRACT

A vehicle sun visor provided with a pair of tracks mounted on an opaque panel, each of which slidably mounts a bearing having oppositely extending pintles rotatably receiving brackets fixed to a first and second semi-transparent tinted extension panel. One or both of the panels may be slid along with its mounting bearing to a position below the lower edge of the opaque panel to reduce glare from the sun's rays or glare from the headlights of an oncoming vehicle and angularly adjusted relative thereto when the opaque panel is insufficient to provide a suitable shield. One of the extension panels may be polarized at a different angle with respect to the other so that when used in combination, glare may be substantially reduced below that normally obtained by the use of only one of the extension panels.

6 Claims, 3 Drawing Figures

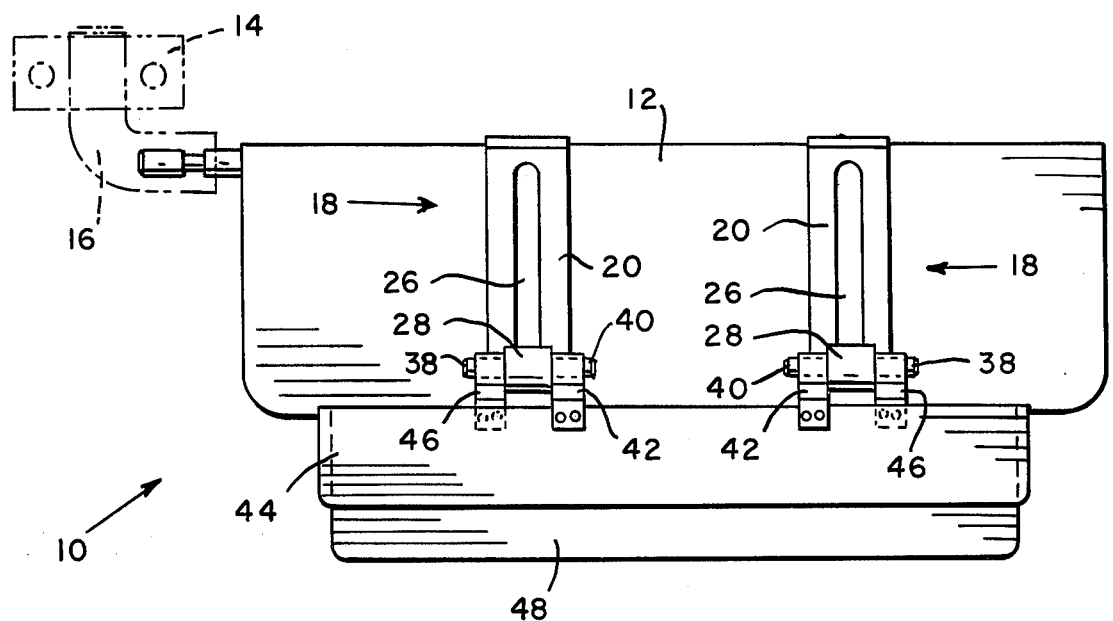
FIG.1
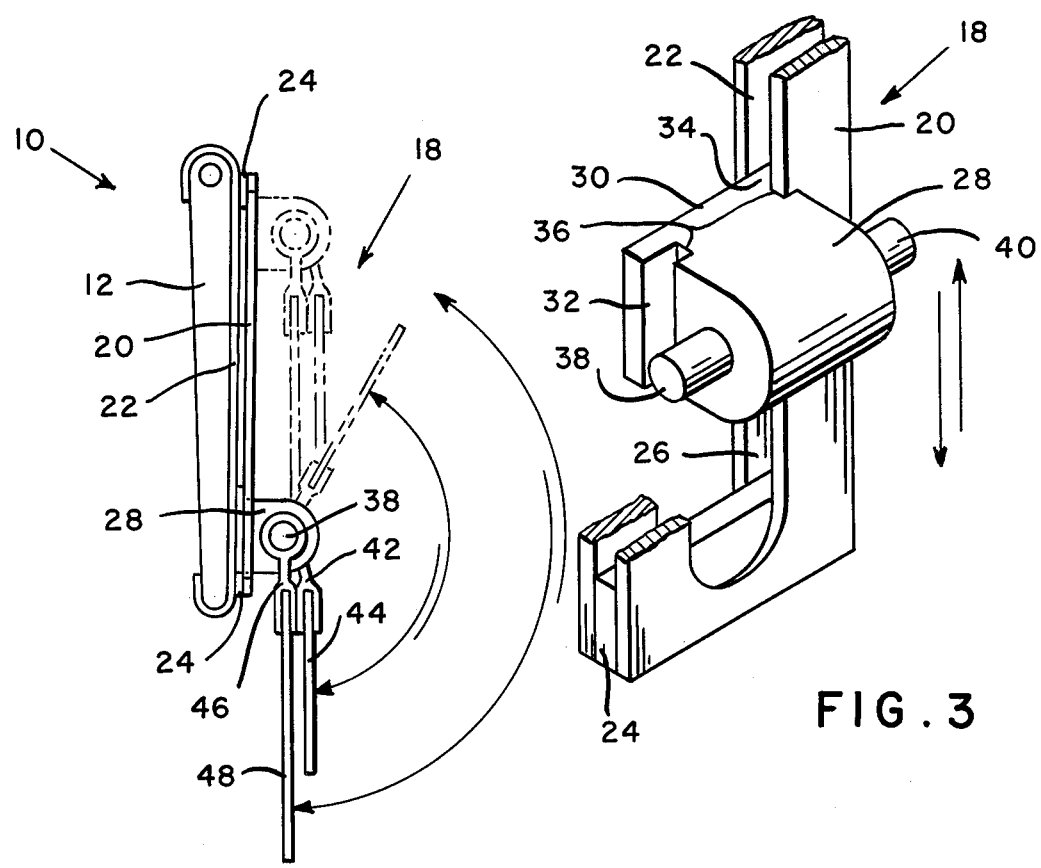
FIG.2
FIG.3

VEHICLE SUN VISOR

PRIOR ART

The following patents are considered pertinent:
U.S. Pat. No. 2,528,038
U.S. Pat. No. 2,622,922
U.S. Pat. No. 3,184,265
U.S. Pat. No. 3,534,999
U.S. Pat. No. 3,617,088
U.S. Pat. No. 3,695,658
U.S. Pat. No. 3,722,949
U.S. Pat. No. 3,853,370
U.S. Pat. No. 3,880,461

BACKGROUND OF THE INVENTION

This invention relates to an automobile or other vehicle sun visor of the type which is pivotably mounted above the windshield of the vehicle to shade the eyes of the driver and passenger from the sun and oncoming vehicle headlights.

Conventional vehicle sun visors consist of a single panel which can be pivoted to a position in which some of the rays of the sun are prevented from reaching the eyes of the driver and passenger. In many instances, the early morning and late evening sun reaches a low angle not intercepted by such conventional sun visors.

Accordingly, it has been proposed to provide a sun visor extension which can be pivoted or slid on the conventional sun visor to a lower position relative to a vehicle windshield to intercept the early morning and late evening sun rays. Yet, none of the prior art devices illustrate an extension which is both pivotable and slidable so as to provide complete freedom of adjustability relative to the sun's rays at various times of the day. Further, such prior art extensions have been devoid of a suitable glare inhibiting panel which can also be used at night to shield the eyes of the vehicle operator and a passenger from oncoming vehicle headlights. This invention relates to an extension which meets all of these criteria.

SUMMARY OF THE INVENTION

In accordance with the invention, the sun visor extension includes a pair of tracks clamped to the conventional vehicle sun visor pivotably mounted adjacent the windshield of a vehicle. Each track includes an elongated slot slidably mounting a bearing. Rotatably mounted on each bearing is a first and second tinted glare panel. One of the glare panels can be used to shield the eyes of the vehicle operator or passenger from low sun's rays or the panels can be used in overlapped combination to shield the eyes of both the vehicle operator and passenger from oncoming headlights by providing a partially polarized light transmission surface substantially reducing glare from oncoming headlights. Because of the sliding and pivotable mounting of the panels, various relative orientations of the panels with respect to the conventional sun visor may be obtained.

BRIEF DESCRIPTION OF THE DRAWING

Further objects and advantages of the invention will become apparent from the following description and claims, and from the accompanying drawing, wherein:

FIG. 1 is a front view in elevation of the vehicle sun visor of the present invention;

FIG. 2 is a side view in elevation of the sun visor of FIG. 1 as seen from the left-hand side of FIG. 1; and FIG. 3 is an enlarged detailed perspective view of a portion of one of the mounting tracks for the sun visor extension panels of the present invention.

DETAILED DESCRIPTION OF THE PREFERRED EMBODIMENT

Referring now to the drawing in detail, wherein like numerals indicate like elements throughout the several views, the vehicle sun visor 10 of the present invention includes a conventional opaque panel 12 hinged at one end to a bracket 14 by a pivot rod 16 which enables panel 12 to rotate about a substantially vertical axis. Panel 12 is also pivotably mounted on rod 16, as is well known in the art, to rotate about a substantially horizontal axis relative to rod 16. Such a mounting is conventional and forms no part of the present invention.

Clamped between the top and bottom edges of opaque sun visor panel 12 are a pair of C-shaped tracks 18. Each of the tracks 18 includes a front and rear plate 20 and 22 connected to each other by spacers 24 at the top and bottom of plates 20 and 22. Each of the tracks 18 includes an elongated slot 26 formed in plate 20 and 22 which slidably mount a bearing 28 having a T-shaped rear extension 30 providing lateral flanges 32 and 34 received in the slots 26 between plates 20 and 22. The stem of T-shaped extension 30 provides opposite grooves 36 on bearing 28 which is slidable along the opposite edges of slot 26 provided by the front plate 20. Each bearing 28 includes a pair of oppositely extending pintles 38 and 40.

One of the pintles 38 and one of the pintles 40 on each bearing 28 rotatably mounts a bracket 42 connected to a first translucent or semi-transparent tinted plastic or glass panel 44. Similarly, the other of the brackets 38 and 40 on each bearing 28 rotatably mounts a bracket 46 fixed to a second translucent or semi-transparent tinted glass or plastic panel 48. Panels 44 and 48 may be partially polarized with respect to each other so as to materially reduce glare when used in combination.

In use, when the sun's rays are at a low elevation with respect to the horizon, bearings 28 may be slid downwardly in slots 26 of each track 18 as shown in the phantom and full lines in FIG. 2. Panel 48 may be used to reduce the glare from the sun's rays by positioning it at an appropriate angle by rotating bracket 48 on its pintles 38 and 40. Panel 44 may have its bracket 42 rotated on its mounting pintles 38 and 40 to an upper out-of-way position as indicated in phantom lines in FIG. 2. At night, when it is desired to reduce the glare of headlights of oncoming vehicles, bracket 42 may be rotated to a down position so that panels 44 and 48 may be used in combination to polarize and thereby substantially reduce glare of oncoming headlights.

While a specific embodiment of a vehicle sun visor has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A vehicle sun visor comprising:
   an opaque panel adapted to be positioned in front of a windshield of a vehicle,
   at least one track having an elongated slot therein mounted on said opaque panel,
   a bearing slidable along said slot in said track, said bearing having a pair of laterally extending pintles,
a first semi-transparent tinted panel rotatably mounted on one of said pintles, and
a second semi-transparent panel rotatably mounted on the other of said pintles.

2. The sun visor of claim 1 including
a pair of tracks having elongated slots therein mounted on said opaque panel,
each of said tracks including a bearing slidably mounted within the slots in said tracks,
each of said bearings including a pair of oppositely extending pintles,
one pintle on each of said bearings rotatably mounting said first semi-transparent panel, and
the other of said pintles on each of said bearings rotatably mounting the other of said semi-transparent panels.

3. The sun visor of claim 2 wherein
each of said tracks includes a pair of spaced plates, and
each of said bearings includes a substantially T-shaped extension received between said spaced plates and defining opposite grooves slidable along the edges of each of said slots in said tracks.

4. The sun visor of claim 3 wherein the rearmost plate of each of said tracks is substantially C-shaped in cross-section forming extensions for engagement with the opposite edges of said opaque sun visor.

5. The sun visor of claim 4 wherein each of semi-transparent panels has a bracket fixed thereto rotatably received on said mounting pintles.

6. The sun visor of claim 5 wherein one of said semi-transparent panels has an axis of polarization different than the axis of polarization of the other of said semi-transparent panels.

* * * * *